(12) United States Patent
Pippuri

(10) Patent No.: US 8,094,825 B2
(45) Date of Patent: Jan. 10, 2012

(54) INTEGRITY PROTECTION OF STREAMED CONTENT

(75) Inventor: Sami Pippuri, Espoo (FI)

(73) Assignee: Nokia Corporation, Espoo (FI)

( * ) Notice: Subject to any disclaimer, the term of this patent is extended or adjusted under 35 U.S.C. 154(b) by 783 days.

(21) Appl. No.: 12/283,622

(22) Filed: Sep. 12, 2008

(65) Prior Publication Data

US 2009/0116646 A1  May 7, 2009

Related U.S. Application Data

(63) Continuation of application No. 10/844,063, filed on May 12, 2004, now Pat. No. 7,477,749.

(51) Int. Cl.
*H04L 9/00* (2006.01)
(52) U.S. Cl. .......... 380/284; 380/283; 380/278
(58) Field of Classification Search .......... 380/284, 380/283, 278
See application file for complete search history.

(56) References Cited

U.S. PATENT DOCUMENTS

2002/0013772 A1  1/2002  Peinado
2002/0080969 A1  6/2002  Giobbi

FOREIGN PATENT DOCUMENTS

WO   WO 02/084980   10/2002

OTHER PUBLICATIONS

Request for Comments 1889, Network Working Group, Audio-Video Transport Working Group, "*RTP: A Transport Protocol for Real-Time Applications*," by H. Schulzrinne et al., Jan. 1996, 75 pp.
Request for Comments 2326, Network Working Group, "*Real Time Streaming Protocol (RTSP)*," by H. Schulzrinne et al., Apr. 1998, 92 pp.
Request for Comments 2543, Network Working Group, "*SIP: Session Initiation Protocol*," by M. Handley et al., Mar. 1999, 153 pp.
M. Baugher, et al; "RFC 3711—The Secure Real-time Transport Protocol (SRTP)"; May 11, 2007; www.faqs.org/rfcs/rfc3711.html; whole document.
XEP-0200; Stanza Encryption; 2007; whole document.
http://www.microsoft.com/technet/community/columns/cableguy/cg1104.mspx; 2006.
A. Barba, et al.; "Key management in the handover. Application to third generation mobile systems"; Personal, Indoor and Mobile Radio Communications; 1995; PIMRC'95; Wireless: Merging onto the Information Superhighway; Sixth IEEE International Symposium; vol. 1, Sep. 27-29, 1995; pp. 300-305.
L. Chen, et al.; "Key Distribution without Individual Trusted Authentication Servers;" Computer Security Foundations Workshop; 1995; Eighth IEEE Proceedings; Jun. 13-15, 1995; pp. 30-36.
M. Badra, et al.; "Key-Exchange Authentication Using Shared Secrets;" IEEE Computer Society; vol. 39, Issue 3, Mar. 2006; pp. 58-66.

*Primary Examiner* — David Y Jung
(74) *Attorney, Agent, or Firm* — Alfred A. Fressola; Ware, Fressola, Van Der Sluys & Adolphson LLP

(57) ABSTRACT

The invention relates to a method, a system, an electronic device and a computer program for providing at least one content stream to an electronic device applying Digital Rights Management (DRM). In the method a master integrity key is obtained in a streaming node. An encrypted master integrity key is obtained in an electronic device. The encrypted master integrity key is decrypted in the electronic device. At least one session integrity key is formed in the streaming node and in the electronic device using at least the master integrity key and the integrity of at least one content stream is protected between the streaming node and the electronic device using the at least one session integrity key.

14 Claims, 4 Drawing Sheets

INTEGRITY PROTECTION OF STREAMED CONTENT

CROSS REFERENCE TO RELATED APPLICATIONS

This application is a continuation of application Ser. No. 10/844,063 filed on May 12, 2004 now U.S. Pat. No. 7,477,749 and is claiming domestic priority under all applicable sections of 35 U.S.C. §120.

BACKGROUND OF THE INVENTION

1. Field of the Invention

The invention relates to digital rights management in electronic devices. Particularly, the invention relates to the establishment of shared secrets and integrity protection of streamed content in electronic devices applying digital rights management.

2. Description of the Related Art

Since the introduction of digital storage technologies more effective copyright enforcement has become an issue. Especially, the emergence of the Internet as an illicit distribution channel for copyright protected content has created a strong demand for new technologies in copyright protection. One such technology is the Digital Rights Management (DRM). The DRM is a common term for standards and proprietary systems where a given content item is augmented with information that specifies user rights associated with it. The content item may, for example, be an audio recording, video, picture, computer program or simply a document. The user rights may comprise various rules pertaining to the use of the content item. For example, a user may be given a time limit during which the content item can be presented, in other words, rendered to the user. Allowed number of listening times, allowed device identities and partial viewing rights are other examples of rules pertaining to the use of a content item. The DRM requires that the presentation device and the presentation software in it are not hostile, that is, they participate in the enforcement of digital rights. In the presentation device there is usually a DRM agent, or in other words, a DRM engine, which enforces the DRM rights and protects the content items from illicit copying. In order to avoid making a DRM protected content item available for copying, the content item may be encrypted while it is in transit from the network to the presentation device and while it is stored in the presentation device outside of the DRM engine, for example, on a hard disk. In the case of content streaming, the DRM protected content is not downloaded completely to the presentation device before it is presented to the user. However, the streamed content may be provided to the presentation device in an encrypted form always when the presentation device requests to start the streaming of the content. Similarly, the content may be provided via the Internet Protocol (IP) multicast periodically. In any case, the content is provided in an encrypted form.

One standard for the DRM is the one based on Open Mobile Alliance (OMA) DRM specification. The aim of the OMA DRM is to enable controlled consumption of digital media objects by allowing content providers to express content rights. The media objects are content items such as audio clips, video clips, pictures, Java applications and documents. Content items governed by rights are referred to as assets. In the OMA DRM content rights are expressed as document objects, that is, documents written using a Rights Expression Language (REL). In order to specify the rights pertaining to an asset it is associated with a REL object. The association between a REL object and an asset may be specified explicitly by mentioning the asset's identifier in the REL object or implicitly by providing the REL object in a same message together with the asset. In the OMA DRM there are three possible methods for delivering content to a terminal and a DRM agent therein. Content is delivered to a mobile terminal in DRM messages. In a DRM message there is a media object and an optional rights object, that is, a REL object. The first method is called forward-lock. In this method no REL object is associated with the media object. The media object is sent in a DRM message, which has no REL object. Default rights known to MT are applied for the media object. For example, they may prevent further distribution of the media object to any other terminal. The second method is referred to as combined delivery. In the combined delivery, a media object is sent together with the REL object in a DRM message. In the third method the media object and the REL object are provided separately. They may be sent via different transports.

A mobile terminal applying the DRM is equipped with a DRM agent, in other words, a DRM engine. A media object or a media stream, in other words a content stream, is provided via the DRM engine to a media application for presentation to the user. The DRM engine decrypts the media object or content stream, if it has been encrypted for protection. The optional encryption has been performed in a content source using encryption that can only be decrypted using a key available to the DRM engine. The key is typically a symmetric encryption/decryption key. The mobile terminal stores also at least one rule object. The rule object is used by the DRM engine to check the user rights pertaining to a given media object. The DRM engine checks the user rights before making the media object or stream available via the media application for rendering to the user.

Reference is now made to FIG. 1, which illustrates the providing of streaming media and content decryption keys to a terminal that is equipped with a DRM agent in prior art. In FIG. 1 there is a content owner entity, which is, for example, a content owner node 110. From content owner node 110, content is provided to a number of streaming servers such as a streaming server 112, which provide encrypted streams to a number of content clients such as content client 114. The actual content stream is sent from streaming server 112, for example, as a Real-Time Protocol stream. The Real-Time Protocol (RTP) is specified in the Internet Engineering Task Force (IETF) Request For Comments (RFC) number 1889. An RTP stream is carried in Internet Protocol (IP) packets. The transport layer may be, for example, Universal Datagram Protocol (UDP). Content client 114 requests from streaming server 112 the starting of the stream, for example, using Session Initiation Protocol (SIP) specified in RFC 2543 or using Real-Time Streaming Protocol (RTSP) specified in RFC 2326. Content client 114 is used as a content presentation device, on which the user may view and listen to streamed presentations. The rights for viewing a content stream are obtained by content client 114 from a rights issuer node 116. The rights comprise at least a Content Encryption Key (CEK), which is used by the DRM engine to decrypt the streaming content. The rights may also comprise information associated with, for example, the validity period for the rights. Due to the fact that the content encryption key is a symmetric key, it is also used as a content decryption key. The content encryption key is provided to the DRM engine in a format, where it has been encrypted using an asymmetric key associated with the DRM engine for the receiving content client. The asymmetric key may, for example, be a public key for the DRM engine within content client 114. In that way only the DRM engine for content client 114 that has in its possession the private key may obtain the content encryption key.

First, a content stream is encrypted by content owner node 110 with a CEK. It should be noted that the format $E_{KEY}$(DATA) denotes a data element referred to as DATA encrypted using KEY as the encryption key. The encrypted content stream is delivered to stream server 112, for example, using bulk file downloading as illustrated with arrow 101. Content owner node 110 provides CEK to rights issuer node 116 as illustrated with arrow 102. As content client 114 desires to start streaming the content, it sends a rights request, in which it identifies itself, to rights issuer node 116 as illustrated with arrow 103. The content client is referred to as C in FIG. 1. In reply to the rights request rights issuer node 116 responds with the CEK, which has been encrypted using content client 114 public key (C-PUB). This is illustrated with arrow 104. Thereupon, content client 114 may start receiving a content stream that has been encrypted using the CEK from streaming server 112. The starting of the streaming may be separately requested from streaming server 112 or the stream may be provided continuously via multicasting or broadcasting without separate request from content client 114.

There are problems in a content streaming architecture such as illustrated in FIG. 1. Despite the fact that content streams such as the stream illustrated with arrow 105 are encrypted using the CEK, it is still possible to manipulate the content stream, if an attacker placed between streaming server 112 and content client 114 gains knowledge pertaining to the effect of bit manipulations the resulting content stream that is rendered to the user. Such knowledge may be gained, if the CEK is not changed frequently enough. However, changing the CEK requires an additional protocol, which complicates the operation of streaming server 112, content client 114 and rights issuer 116. An example of a protocol used for this purpose is the Multimedia Internet Keying (MIKEY) specified in an IETF document draft-ietf-msec-mikey-07.txt (work in progress).

SUMMARY OF THE INVENTION

The invention relates to a method of providing at least one content stream to an electronic device applying Digital Rights Management (DRM). In the method a master integrity key is encrypted using the content key; the electronic device requests information on at least one content stream from the streaming node; at least one seed value is chosen; information is received in the electronic device on the at least one content stream, the information comprising at least the at least one seed value and the encrypted master integrity key; the encrypted master integrity key is decrypted using the content key in the electronic device; at least one session integrity key is formed using the at least one seed value and the master integrity key in the electronic device and the streaming node; in the streaming node is formed at least one integrity protected content stream using the at least one session integrity key; from the streaming node is provided to the electronic device the at least one integrity protected content stream; and the integrity of the at least one integrity protected content stream is checked in the electronic device using the at least one session integrity key.

The invention relates also to a method of providing at least one content stream to an electronic device applying Digital Rights Management (DRM). In the method a master integrity key is obtained in a streaming node; an encrypted master integrity key is obtained in an electronic device; said encrypted master integrity key is decrypted in said electronic device; at least one session integrity key is formed in said streaming node and in said electronic device using at least said master integrity key; and the integrity of at least one content stream is protected between said streaming node and said electronic device using said at least one session integrity key.

The invention relates also to a system comprising: at least one terminal node configured to request information on at least one content stream, to receive information on at least one content stream comprising at least one seed value and an encrypted master integrity key, to decrypt the encrypted master integrity key using a content key, to form at least one session integrity key using the at least one seed value and the master integrity key, and to check the integrity of the at least one integrity protected content stream in the electronic device using the at least one session integrity key; and a streaming node configured to choose at least one seed value, to form at least one session integrity key using the at least one seed value and a master integrity key, to provide information comprising at least the at least one seed value and the encrypted master integrity key to the terminal node, to form at least one integrity protected content stream using the at least one session integrity key, and to provide to the electronic device the at least one integrity protected content stream.

The invention relates also to a system comprising: at least one terminal node configured to obtain an encrypted master integrity key, to decrypt said encrypted master integrity key, to form at least one session integrity key using at least said master integrity key, and to verify the integrity of at least one content stream received from a streaming node using said at least one session integrity key; and said streaming node configured to obtain said master integrity key, to form at least one session integrity key using at least said master integrity key, and to protect the integrity of at least one content stream transmitted to said at least one terminal node using said at least one session integrity key.

The invention relates also to an electronic device configured to receive at least one content stream, the electronic device further comprising: digital rights management means configured to store a content key, to decrypt an encrypted master integrity key using the content key, to form at least one session integrity key using at least one seed value and the master integrity key, and to check the integrity of at least one integrity protected content stream using the at least one session integrity key; and communication means configured to communicate with the digital rights management means, to request in-formation on at least one content stream from the streaming node, to receive information on at least one content stream comprising at least one seed value and the encrypted master integrity key, and to receive from the streaming node the at least one content protected stream.

The invention relates also to an electronic device configured to receive at least one content stream, the electronic device further comprising: digital rights management means configured to decrypt an encrypted master integrity key, to form at least one session integrity key using at least said master integrity key, and to verify the integrity of at least one content stream using said at least one session integrity key; and communication means configured to receive said encrypted master integrity key and to receive at least one content stream from a streaming node.

The invention relates also to a computer program comprising code adapted to perform the following steps when executed on a data-processing system: encrypting a master integrity key using the content key; requesting by the electronic device information on at least one content stream from the streaming node; choosing at least one seed value; receiving information in the electronic device on the at least one content stream, the information comprising at least the at least one seed value and the encrypted master integrity key; decrypting the encrypted master integrity key using the content key in the electronic device; forming at least one session integrity key using the at least one seed value and the master integrity key in the electronic device and the streaming node; forming in the streaming node at least one integrity protected content stream using the at least one session integrity key; providing from the streaming node to the electronic device the at least one integrity protected content stream; and checking in the electronic device the integrity of the at least one integrity protected content stream using the at least one session integrity key.

The invention relates also to a computer program comprising code adapted to perform the following steps when executed on a data-processing system: obtaining a master integrity key in a streaming node; obtaining an encrypted master integrity key in an electronic device; decrypting said encrypted master integrity key in said electronic device; forming at least one session integrity key in said streaming node and in said electronic device using at least said master integrity key; and protecting the integrity of at least one content stream between said streaming node and said electronic device using said at least one session integrity key.

In one embodiment of the invention, an integrity protected content stream means a content stream comprising integrity check data formed using a session integrity key. The integrity check data may be, for example, a frame check sequence encrypted using a session key. The frame check sequence has been obtained by computing, for example, a hash code or a message digest algorithm from a given part of the encrypted or unencrypted content stream. The integrity check data may also be transmitted separately. In one embodiment of the invention the streaming node is a streaming server and the electronic device is a content client.

In one embodiment of the invention, an integrity check is performed on the seed value and the encrypted master integrity key using the session integrity key in the electronic device. The purpose is to avoid attacks where the seed value and the encrypted master integrity key are changed by an attacker located between the streaming server and the electronic device.

In one embodiment of the invention the forming of the session integrity key and the integrity checking of the at least one content stream is performed in a Digital Rights Management (DRM) engine, that is, digital rights management means, or in other words a DRM entity, in association with the electronic device. The digital rights management means may be implemented, for example, as software within the electronic device, or using a hardware module and possible accompanying software. The term digital rights management means may also mean in general the parts of electronic device software in charge of digital rights management related tasks, in other words, they may not form a clearly separable logical entity within the software.

In one embodiment of the invention, the content key is provided to a rights issuer node from the content owner node. The content key is encrypted using a public key associated with the electronic device. The public key may also be associated with a user of the electronic device. A content rights request is received identifying the electronic device in the rights issuer node. At least the encrypted content key is sent to the electronic device in response to the rights request. The encrypted content key is decrypted in the digital rights management means in the electronic device.

In one embodiment of the invention, the encrypted master integrity key is provided from a content owner node to a streaming node and the encrypted master integrity key is stored in the streaming node.

In one embodiment of the invention, an IP packet stream comprises the at least one content stream.

In one embodiment of the invention, the content key is a symmetric key used in symmetric encryption. The content key is a content encryption/decryption key.

In one embodiment of the invention, the electronic device is a mobile station. The mobile station may be a Universal Mobile Telecommunication System (UMTS) mobile station, a General Packet Radio System (GPRS) mobile station. In a mobile station the user of the electronic device is identified using a Subscriber Identity Modules (SIM).

In one embodiment of the invention, the electronic device is a fixed IP network terminal.

In one embodiment of the invention rights that are associated with media objects and content streams are represented as rule objects or documents, for example, expressed in OMA REL format.

In one embodiment of the invention, the electronic device is a mobile device, for example, a WLAN terminal or a terminal within an arbitrary cellular radio system. The terminal may also be a fixed data network or telecommunication network terminal.

In one embodiment of the invention, the computer program is stored on a computer readable medium. The computer readable medium may be a removable memory card, magnetic disk, optical disk or magnetic tape.

In one embodiment of the invention, the electronic device is a mobile device, for example, a laptop computer, palmtop computer, mobile terminal or a personal digital assistant (PDA). In one embodiment of the invention the electronic device is a desktop computer or any other computing device.

The benefits of the invention are associated with improved digital rights management protection. With the invention it is now possible to avoid the hampering of content streams in transit between a streaming node and an electronic device. A further benefit is that the integrity protection keys are not exposed. The server is not allowed to generate new encryption keys, which avoids the danger of attacks utilizing the server and the compromising of the plaintext content streams.

The invention avoids the requirement to use additional security protocols. Furthermore, the invention provides authenticity of the content, which is verified using the content key that is known only to the content owner and the digital rights management means in the electronic device. The invention provides authenticity of the origin of content using a server trusted master integrity key from the content owner node. The invention may also be applied for integrity protection of unencrypted content streams.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
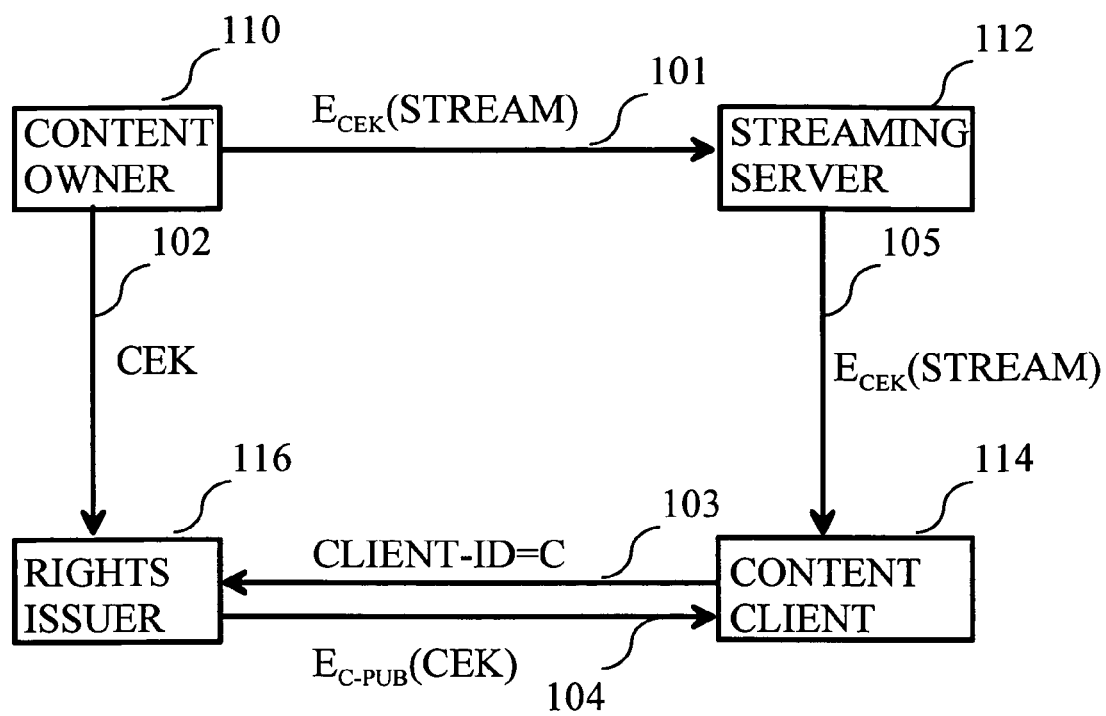
FIG. 1 is a block diagram illustrating DRM protected streaming to a content client in prior art.
Figure 2:
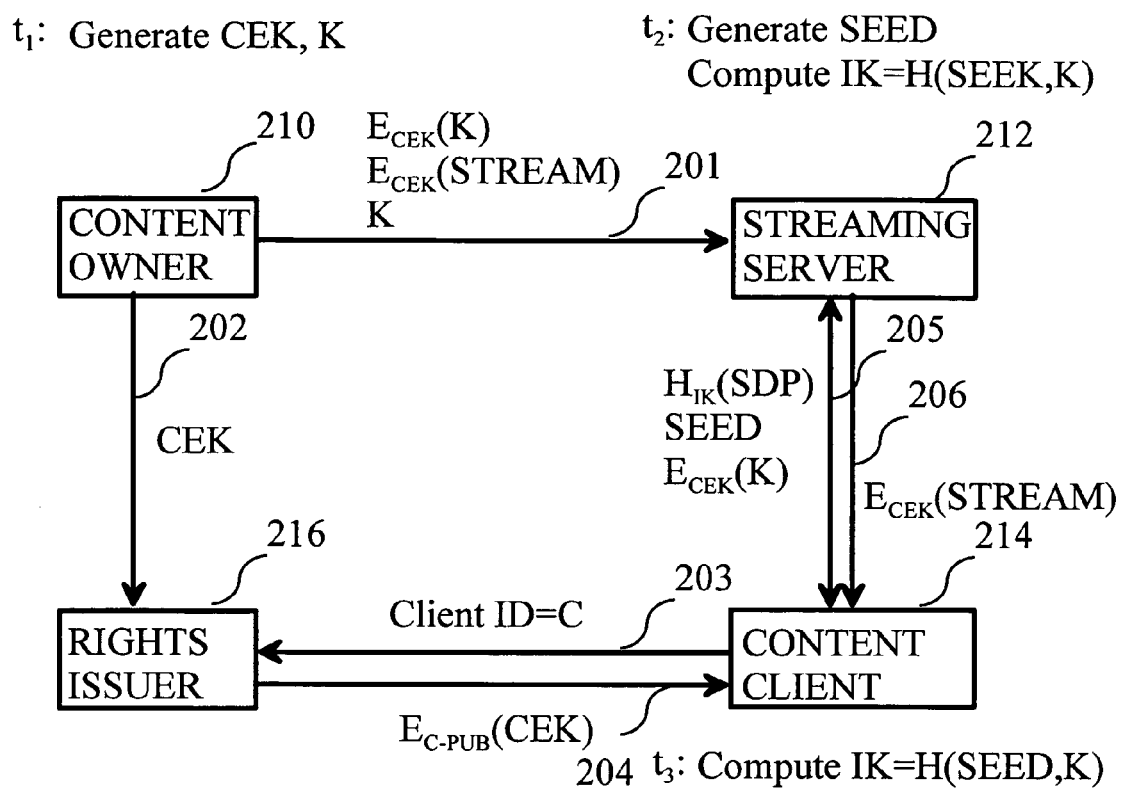
FIG. 2 is a block diagram illustrating DRM protected and integrity protected streaming to a content client, according to the invention.

FIG. 2 is a block diagram illustrating DRM protected and integrity protected streaming to a content client 214. There is a content owner entity, which is, for example, a content owner node 210. From content owner node 210, content is provided to a number of streaming servers such as a streaming server 212, which provide encrypted streams to a number of content clients such as content client 214. The content forms a multimedia presentation, which comprises typically two media components, one media component for video and one media component for audio. The media components comprise the video and audio recordings in an encoded format. The video may be encoded, for example, using Motion Picture Experts Group (MPEG) coding MPEG-4. The audio may be encoded, for example, using Adapted Multi-Rate (AMR) coding used in the GSM system for mobile communications. The content for a multimedia presentation is streamed from streaming server 212, for example, as at least one Real-Time Protocol streams. The Real-Time Protocol (RTP) is specified in the Internet Engineering Task Force (IETF) Request For Comments (RFC) number 1889. An RTP stream is used to carry a media stream, in other words, a content stream comprising, for example, encoded video or audio data. In one embodiment of the invention, there is an RTP stream for each media component associated with a multimedia presentation, one for audio and another one for video. In one embodiment of the invention, the media components may also be multiplexed to a single RTP stream.

Content client 214 requests from streaming server 212 the starting of a stream, for example, using the Session Initiation Protocol (SIP) specified in RFC 2543 or using the Real-Time Streaming Protocol (RTSP) specified in RFC 2326. Content stream properties for the media components associated with a multimedia presentation are described using the Session Description Protocol (SDP) specified in IETF 2327. The SDP specifies a description document format for describing the content streams, their properties and associated transport addresses. An SDP description, in other words shortly expressed an SDP, is provided by a streaming server in response to a streaming information request or in response to a streaming start request. With the SDP description a content client is able to determine, for example, the RTP stream addresses and media encoding used in the streams.

Content client 214 is used as a content presentation device, on which the user may view and listen to streamed presentations. The rights for viewing a content stream are obtained by content client 214 from a rights issuer node 216. The rights comprise at least a Content Encryption Key (CEK), which is used by the DRM engine to decrypt the streaming content. The rights may also comprise information associated with, for example, the validity period for the rights. Due to the fact that the content encryption key is a symmetric key, it is also used as the content decryption key. The content encryption key is provided to the DRM engine in a format, where it has been encrypted using an asymmetric key associated with the DRM engine for the receiving content client. The asymmetric key may, for example, be a public key for the DRM engine within content client 214. In that way only the DRM engine for content client 214 that has in its possession the private key may obtain the content encryption key.

First, at time $t_1$ content owner node 210 generates a Content Encryption/decryption Key (CEK), which is a symmetric key, and a master integrity key (K). Thereupon, content owner node provides the K, the K encrypted using the CEK, referenced to as $E_{CEK}(K)$ in FIG. 2, and at least one stream encrypted using the CEK, referenced to as $E_{CEK}(STREAM)$ in FIG. 2, to streaming server 212. The $E_{CEK}(STREAM)$, the $E_{CEK}(K)$ and the K are delivered to stream server 212, for example, using the File Transfer Protocol (FTP), the Hypertext Transfer Protocol (HTTP) or the HTTPS (Secure HTTP) downloading as illustrated with arrow 201. Instead of downloading also physical media based delivery may be used for them. They may be delivered as separate files or as a single file. When streaming server 212 has received at least the K, at time $t_2$ it generates a random seed value, referenced to as SEED in FIG. 2, and computes a session integrity key (IK) using the formula IK=H(SEED,K), wherein the K is the master integrity key, the SEED the random seed value and the Ho is a one-way hash function. Content owner node 210 provides the CEK to rights issuer node 216 as illustrated with arrow 202. As content client 214 desires to start streaming the multimedia presentation, it sends a rights request, in which it identifies itself, to rights issuer node 216 as illustrated with arrow 203. The content client identity is referred to as C in FIG. 2. In reply to the rights request rights issuer node 216 responds with the CEK, which has been encrypted using a public key (C-PUB) of content client 214, as illustrated with arrow 204. The CEK is decrypted in the DRM engine in association with content client 214. The CEK is known only in the DRM engine. Thereupon, content client 214 may start receiving a content stream that has been encrypted using the CEK, namely the $E_{CEK}(STREAM)$ in FIG. 2, from streaming server 212.

Content client 214 sends a streaming information request, for example, an RTSP Describe operation, to streaming server 212. Streaming server 212 responds with a message comprising at least the information elements $H_{IK}(SDP)$, SEED and $E_{CEK}(K)$ comprised in an SDP description. The $H_{IK}(SDP)$ is a hash code computed from the SDP description returned by streaming server 212. The $H_{IK}(SDP)$ is a message authentication code, which verifies that the SDP description has not been hampered in transit from streaming server 212 to content client 214. When content client 214 has received the $E_{CEK}(K)$, it forwards the $E_{CEK}(K)$ to its DRM engine, which obtains K by decrypting the $E_{CEK}(K)$ using the CEK. Thereupon, at time $t_3$ the DRM engine in association with content client 214 also computes IK=H(SEED,K) and obtains the session integrity key (IK), which is the same as computed by streaming server 212 at time $t_2$. Thereupon, content client 214 may start receiving a stream encrypted using the CEK from streaming server 212. The starting of the streaming may be separately requested from streaming server 212 or the stream may be provided continuously via multicasting or broadcasting without separate request from content client 214. Encrypted stream $E_{CEK}(STREAM)$ is forwarded to the DRM engine in association with content client 214. In the DRM engine, stream $E_{CEK}(STREAM)$ is decrypted using the CEK to obtain the plaintext content stream, referenced to in FIG. 2 as STREAM.

In one embodiment of the invention, streaming server 212 prepares a pre-generated SDP description, which is delivered to content client 214. Streaming server 212 may decide to change the seed value and respond to an RTSP Setup command issued by content client 214 using an RTSP Redirect command. The receiving of RTSP Redirect command in content client 214 results in that it sends an RTSP Describe command repeatedly to obtain at least one new seed value from streaming server 212.

In one embodiment of the invention, the IK is applied so that a byte sequence of predefined length is extracted in both streaming server 212 and content client 214. The byte sequence may be, for example, a packet, a set of packets or any content frame. Thereupon, a hash code is computed from the byte sequence. The hash code is then encrypted using the IK. The encrypted hash code is provided by streaming server 212 in association with encrypted stream $E_{CEK}$(STREAM) to content client 214, which provides the encrypted hash code along with the encrypted stream to the DRM engine. The DRM engine decrypts the hash code using the IK and computes in the same way a second hash code using the same byte sequence. If the hash codes agree, received content stream $E_{CEK}$(STREAM) is proven unaltered.

In one embodiment of the invention, a separate session integrity key is formed for each of the at least one content stream in the streaming node, that is, a streaming server. There is also generated a separate seed value for each of the at least one content stream. The seed values are provided from the streaming node to the electronic device. Session integrity keys are formed using the seed values and the master integrity key in the electronic device. From the streaming node to the electronic device is provided the at least one content stream and the integrity check data associated with each of the at least one content stream. The integrity of the at least one content stream is checked in the electronic device using the session integrity keys, the integrity check data associated with each of the at least one content stream and the at least one content stream. In other words, the separate seed values are used in the electronic device to form session keys associated with each separate content stream. Each seed value is used in the electronic device to form the same session integrity keys as were formed in the streaming node. Thereupon, the integrity of a given content stream is checked in the electronic device using the session integrity key generated for that particular content stream, the integrity check data associated with that particular content stream and the content stream itself. In one embodiment of the invention, several content streams use the same session integrity key.

Figure 3:
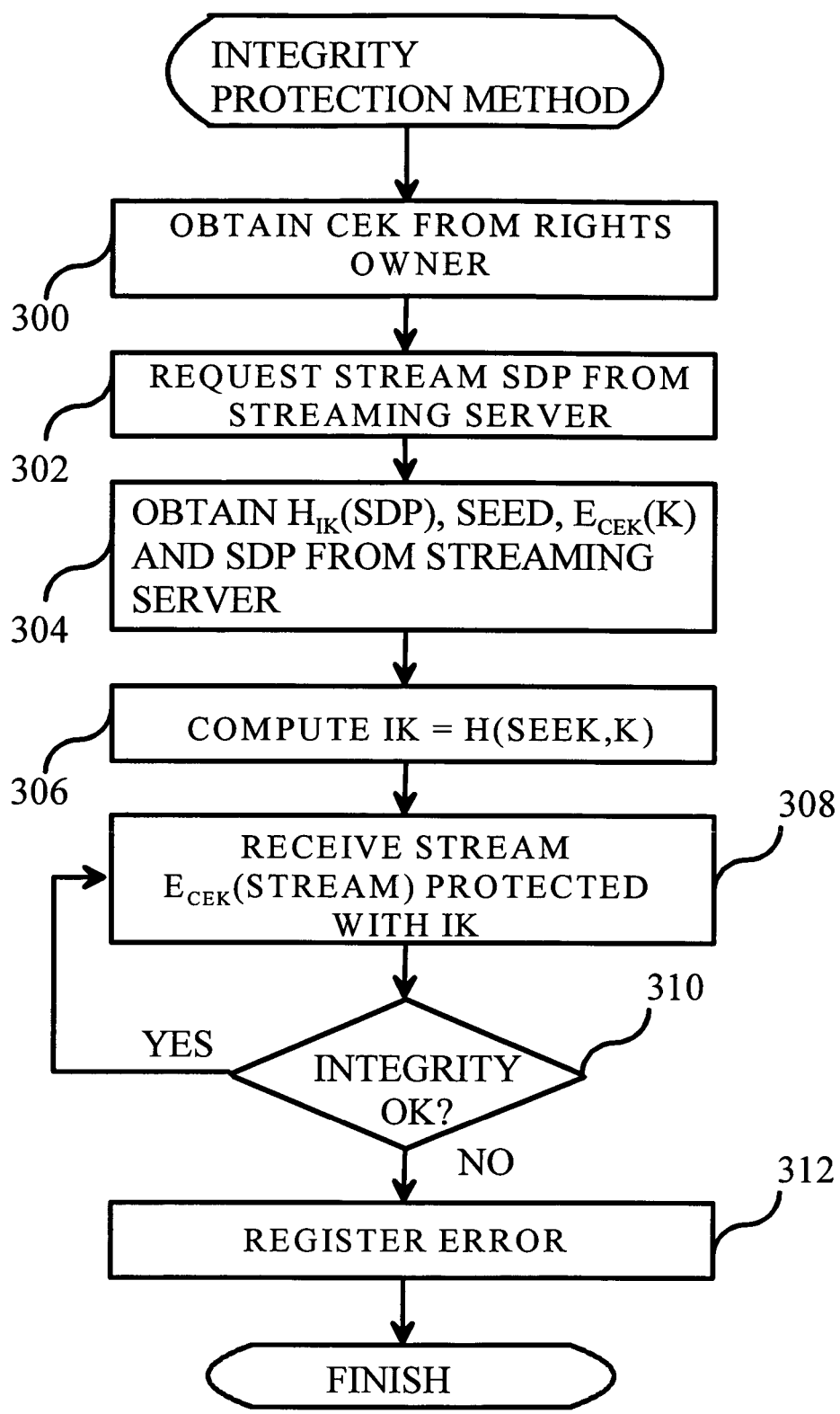
FIG. 3 is a flow chart depicting one embodiment of an integrity protection method for DRM protected streams, according to the invention.

FIG. 3 is a flow chart depicting one embodiment of an integrity protection method for DRM protected streams in a content client such as a content client 214 in FIG. 2. At step 300 the content client obtains a Content Encryption Key (CEK) from a rights owner node. The obtaining of the CEK may occur in response to a payment transaction for a given multimedia presentation. At step 302 content client requests a stream description associated with a requested multimedia presentation from a streaming server. At step 304 the content client obtains in response at least the information elements $H_{IK}$(SDP), SEED and $E_{CEK}$(K) comprised in an SDP description. The $H_{IK}$(SDP) is a hash code computed from the SDP description returned by streaming server 212. The $H_{IK}$(SDP) is a message authentication code, which verifies that the SDP description has not been hampered in transit from the streaming server to the content client. At step 306 the content client provides the SEED and $E_{CEK}$(K) to its DRM engine. The DRM engine decrypts the K using the CEK and computes a session integrity key, referenced as IK in FIG. 3, using the formula IK=H(SEED,K), wherein the K is a master integrity key, the SEED the random seed value and the H( ) is a one-way hash function. At step 308 the content client receives an encrypted content stream $E_{CEK}$(STREAM) that has also been protected using the IK. The encrypted content stream is forwarded via the DRM engine to a multimedia presentation application in the content client. The DRM engine decrypts the content stream using the CEK. At step 310 the content client checks the integrity of the received encrypted content stream $E_{CEK}$(STREAM) using the IK. The integrity check may be based, for example, on a periodically received check sequence that has been encrypted by the streaming server using the IK. If the integrity is check is successful, that is no integrity violation is detected, method continues at step 308 where the content client receives more of the encrypted content stream. If the integrity is not successful, at step 312 the content client registers an error and stops presenting the content stream for the user. The user is also provided an error message and an error report message may be sent to the streaming server.

In one embodiment of the invention, the obtaining of the Content Encryption Key (CEK) from a rights owner node is performed by the content client only in response to the obtaining of the SDP description. Therefore, the step 300 is performed after the step 304. The obtaining of the CEK involves a payment transaction for a given multimedia presentation.

In one embodiment of the invention, the content client checks the integrity of the SDP description using IK after the content client has computed it.

Figure 4:
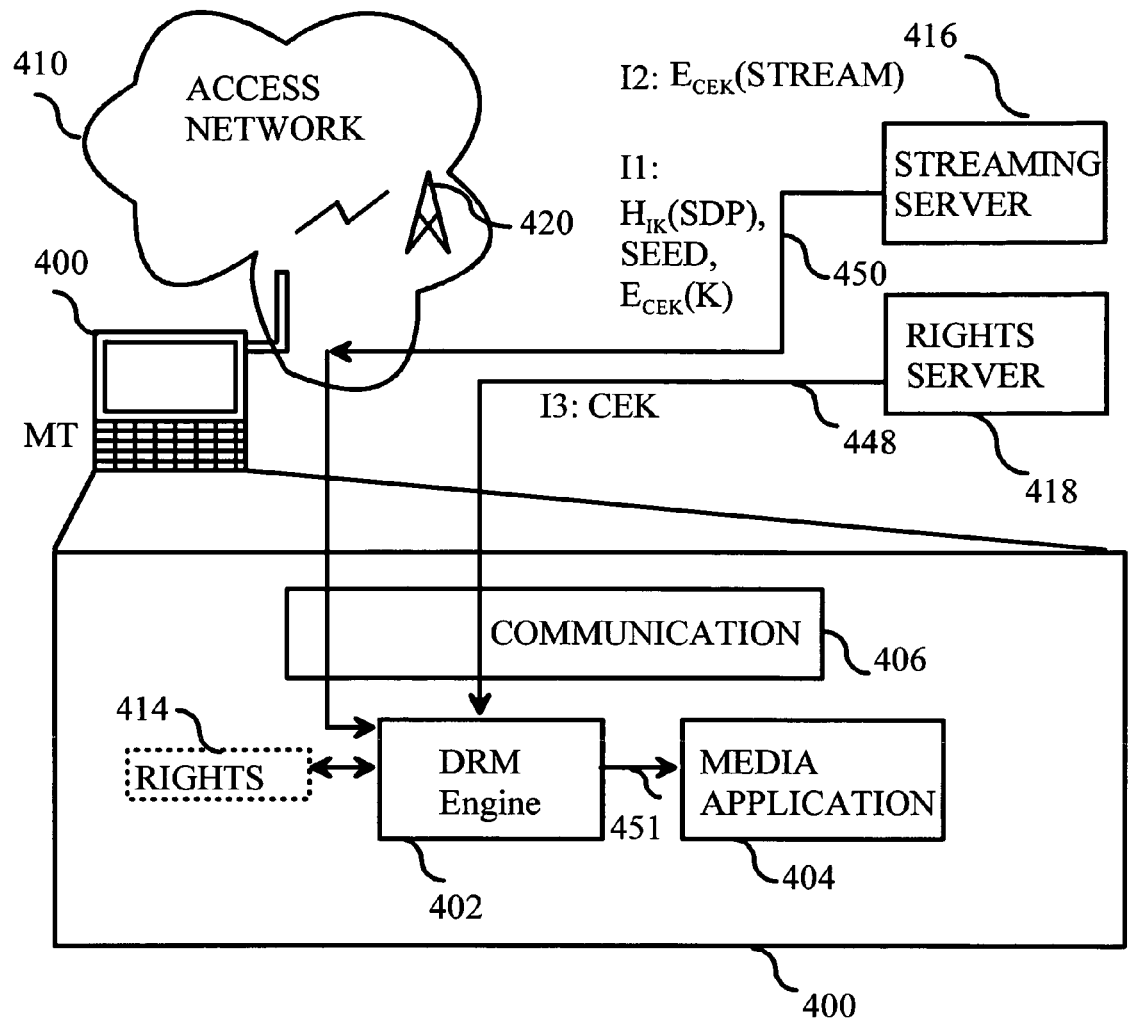
FIG. 4 is a block diagram illustrating a mobile terminal and a system for applying integrity protection for DRM protected streams, according to the invention.

Reference is now made to FIG. 4, which is a block diagram illustrating a mobile terminal 400 and a system for applying integrity protection for DRM protected streams in one embodiment of the invention. The Mobile Terminal (MT) 400 is in communication with a base station 420, which is in association with an access network 410. To access network 410 is connected at least a streaming server 416 and a rights server 418. MT 400 comprises a DRM engine 402, in other words, a DRM agent or a DRM entity, a media application 404 and at least one rights object. MT 400 comprises also a communication entity 406, in other words communication means, which is configured to receive messages from access network 410 and to perform protocol layer processing, for example, for physical layer, link layer and network layer protocols. In one embodiment of the invention, communication entity 406 performs IP packet processing and comprises the Universal Datagram Protocol (UDP) and Transmission Control Protocol (TCP) processing functionality. Communication entity 406 is configured to communicate with DRM engine 402 and media application 404. MT 400 is configured to forward messages received in communication entity 406 onwards to DRM engine 402 or media application 404 based on the content of the messages. In MT 400 may be stored at least one media object, which is provided via DRM engine 402 to media application 404. MT 400 may also receive an encrypted stream carrying a media component. MT 400 provides the encrypted stream to DRM engine 402, which decrypts the stream using a content decryption key revealed only to DRM engine 402. Encrypted content stream is sent from streaming server 416 to DRM engine 402 via MT 400 as illustrated in FIG. 4 using arrow 450. Arrow 450 also illustrates the providing of an SDP description comprising information elements $H_{IK}$(SDP), SEED and $E_{CEK}$(K) to MT 400, before receiving of the encrypted content stream. The SDP description information elements are referred to as I1 in FIG. 4, whereas the encrypted content stream is referred to as I2. DRM engine 402 decrypts a media object or a media stream that is streamed to MT 400, if it has been encrypted for protection. The encryption has been performed in a content source using encryption that can only be decrypted using a key available to DRM engine 402. MT 400 stores also at least one rights object 414 or receives content streams from a streaming server such as streaming server 416. Rights object 414 is used by DRM engine 402 to check the user rights pertaining to a given media object such as a media object stored in MT 400. DRM engine 402 checks the user rights before making a media object available via media application 404 for rendering to the user. Rights object 414 may also comprise a content decryption key such as the CEK disclosed in association with FIGS. 2 and 3. Rights object 414 is obtained from rights server 418 in association with a rights purchase procedure. Rights object 414 provides at least the content encryption/decryption key CEK to DRM engine 402 as illustrated with arrow 448 in FIG. 4. The CEK is referred to as information element 13 in FIG. 4. It should be noted that, in one embodiment of the invention, a content client is a fixed IP network terminal. In such a case the streaming server and the rights server are connected to the content client using a fixed access network. A fixed IP network terminal also comprises at least a rights object, a DRM engine and a media application in a manner similar to MT 400.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method, comprising:
requesting by an electronic device information on at least one content stream from a streaming server;
receiving information in said electronic device on the at least one content stream, the information comprising at least one seed value and a master integrity key encrypted with a content key;
decrypting said encrypted master integrity key using said content key in said electronic device;
forming at least one session integrity key using said at least one seed value and said master integrity key in said electronic device;
receiving from said streaming server at said electronic device said at least one integrity protected content stream, said integrity protected content stream being protected with said at least one session integrity key;
checking in said electronic device the integrity of said at least one integrity protected content stream using said at least one session integrity key;
decrypting said at least one integrity protected content stream using at least in part the content key; and
storing said master integrity key in said streaming server, wherein said master integrity key being received from a content owner node.

2. An apparatus comprising:
a digital rights management engine configured to store a content key, to decrypt an encrypted master integrity key using said content key, to form at least one session integrity key using at least one seed value and said master integrity key, and to check the integrity of at least one integrity protected content stream using said at least one session integrity key; and
a communication entity communicatively connected to said digital rights management engine, said communication entity configured to send at least one request for information on at least one content stream from a streaming server, to receive information on at least one content stream comprising at least one seed value and said encrypted master integrity key, and to receive from said streaming server said at least one integrity protected content stream.

3. The apparatus according to claim 2, wherein said digital rights management engine is configured to perform an integrity check on said at least one seed value and said master integrity key using at least one session integrity key.

4. The apparatus according to claim 2, wherein said communication entity is configured to receive an encrypted content key and said digital rights management engine is configured to decrypt said encrypted content key.

5. The apparatus according to claim 2, wherein an internet protocol packet stream comprises said at least one content stream.

6. The apparatus according to claim 2, wherein said content key comprises a symmetric key.

7. The apparatus according to claim 2, wherein said electronic device comprises a mobile station.

8. The apparatus according to claim 7, wherein said mobile station comprises a Universal Mobile Telecommunication System mobile station.

9. The apparatus according to claim 7, wherein said mobile station comprises a General Packet Radio System mobile station.

10. The apparatus according to claim 2, wherein said electronic device comprises a fixed internet protocol network terminal.

11. The apparatus according to claim 2, wherein the apparatus further comprises:
a media application continuing the presentation of said at least one integrity protected content stream to the user of the apparatus, if the integrity check of the at least one integrity protected content stream is successful.

12. A data-processor readable medium stored with code, the code configured to perform the following when executed on a data-processor:
requesting information on at least one content stream from a remote node;
receiving information on at least one content stream, the information comprising at least one seed value and a master integrity key encrypted with a content key;
decrypting said encrypted master integrity key using said content key;
forming at least one session integrity key using said at least one seed value and said master integrity key;
receiving from said remote node said at least one integrity protected content stream, said integrity protected content stream being protected with said at least one session integrity key;
checking the integrity of said at least one integrity protected content stream using said at least one session integrity key;
indicating an error to a user of an electronic device, if the integrity check fails; and
continuing the presenting of said at least one integrity protected content stream to the user of the electronic device if the integrity check is successful.

13. The readable medium according to claim 12, wherein said readable medium comprises a removable memory card.

14. The readable medium according to claim 12, wherein said readable medium comprises a magnetic or optical disk.

* * * * *